United States Patent [19]

Brennan

[11] 4,058,236

[45] Nov. 15, 1977

[54] METHOD AND APPARATUS FOR HANDLING AND ORIENTATION OF FRAGILE ARTICLES

[75] Inventor: Raymond J. Brennan, Emporium, Pa.

[73] Assignee: GTE Sylvania Incorporated, Stamford, Conn.

[21] Appl. No.: 648,269

[22] Filed: Jan. 12, 1976

[51] Int. Cl.² .............................................. B65H 9/00
[52] U.S. Cl. .................................. 221/163; 198/380; 198/381; 198/396; 198/416; 198/690; 221/212
[58] Field of Search ................ 198/287, 288, 289, 41, 198/236, 246, 254, 255, 256, 267, 416, 690, 380, 381, 396; 221/163, 212, 224, 278; 294/65.5; 214/1 B

[56] References Cited

U.S. PATENT DOCUMENTS

| | | | |
|---|---|---|---|
| 787,623 | 4/1905 | Hood | 221/212 |
| 1,801,119 | 4/1931 | Soepnel et al. | 221/212 X |
| 2,544,114 | 3/1951 | Steinberg | 221/212 |
| 3,034,633 | 5/1962 | Clifford et al. | 198/288 |
| 3,054,170 | 9/1962 | Benichasa et al. | 198/254 |
| 3,124,260 | 3/1964 | Tidball | 294/65.5 |
| 3,194,389 | 7/1965 | Grgetic | 198/256 X |
| 3,317,702 | 5/1967 | Mann | 198/41 |
| 3,448,894 | 6/1969 | Modrey et al. | 221/212 X |
| 3,460,492 | 8/1969 | Dickinson et al. | 221/212 X |

Primary Examiner—John J. Love
Assistant Examiner—Douglas D. Watts
Attorney, Agent, or Firm—William H. McNeill

[57] ABSTRACT

A fragile article handling and orientating apparatus comprises a disoriented supply of the articles. Pick-up means associated with the supply and adjacent thereto are actuatable into engagement with the supply whereby the pick-up means engages a plurality of the articles. Further means are then provided for moving the pick-up means to a delivery zone. Positioned intermediate the supply and the delivery zone is a stripper means for stripping off all but one article, and insuring that the remaining article has a particular, desired orientation. At the delivery zone means are provided for removing the article therefrom and delivering it to a remote location.

9 Claims, 7 Drawing Figures

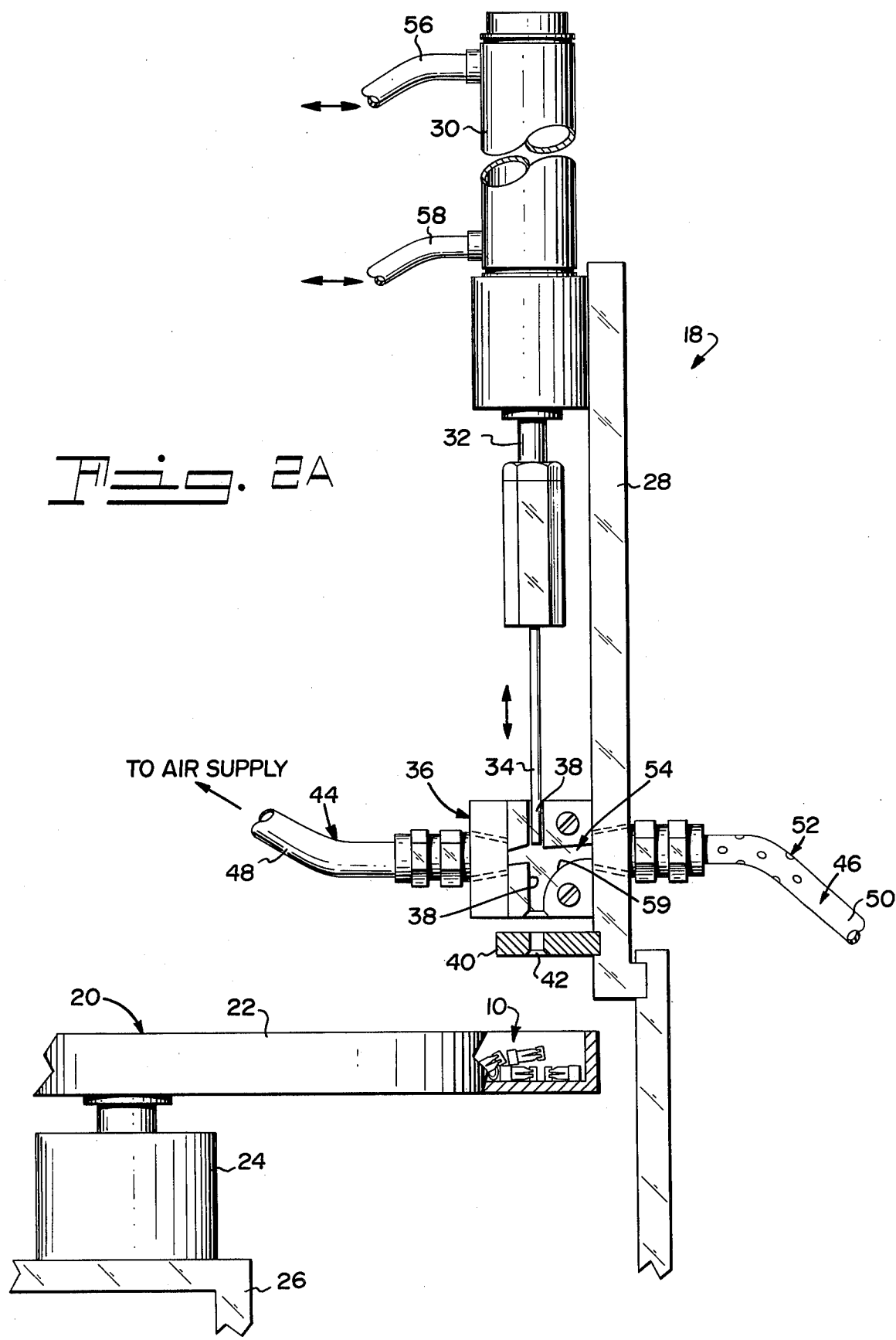

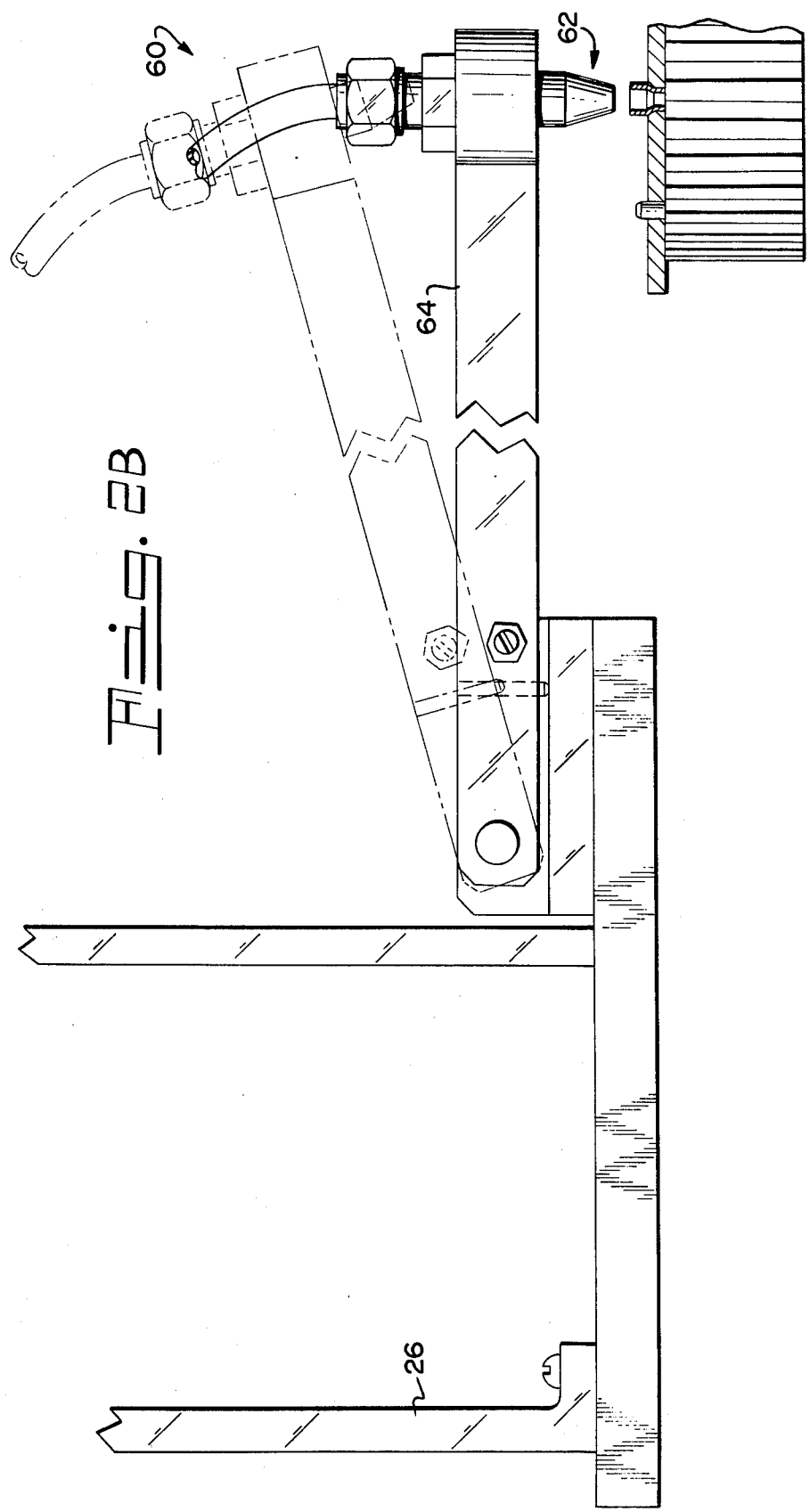

METHOD AND APPARATUS FOR HANDLING AND ORIENTATION OF FRAGILE ARTICLES

BACKGROUND OF THE INVENTION

This invention relates to a fragile article handling and orientating apparatus, and more particularly, to such an apparatus having a magnetic pick-up means for dealing with magnetic articles of a fragile nature. Still more particularly the invention relates to an apparatus for handling and orienting cathodes for a cathode ray tube by picking them up from a random, disoriented supply, orienting the cathode in a desired position, and delivering the cathode to a remote location.

The cathodes for cathode ray tubes are extremely fragile structures and generally comprise a tubular sleeve of a very thin walled, passive, non-magnetic nickel material on the order of 0.002 inch thick. This cathode sleeve is topped by a substantially cup-shaped top cap, which is formed from an active nickel, which is magnetic. In some instances, attachment of the top cap to the sleeve is made by a plurality of limited area contacts. These limited area contacts can be formed by cut-out portions of the cathode sleeve. In the manufacture of electron tubes employing such cathodes, it is necessary to occasionally handle the cathodes for various purposes. At least one time requiring handling is for the loading of the cathodes into trays so that a potentially emissive material can be applied to the outer most surface of the top cap. At the present time this operation is performed entirely by a manual labor, with an operator grabbing a single individual cathode with a pair of tweezers and manually inserting this cathode into a suitable tray, whereby the potentially emissive material can be applied. As noted above, the fragile nature of the cathode makes such handling a delicate and time consuming operation. The thinness of the wall construction makes it entirely possible to crush the cathode between the fingers or between the tweezers. Accordingly, it would be a decided advance in the art if a suitable automatic method of handling these cathodes could be provided.

OBJECTS AND SUMMARY OF THE INVENTION

It is therefore an object of the invention to enhance the handling of fragile articles.

It is another object of the invention to accomplish a desired orientation of the articles together with the handling.

It is yet another object of the invention to provide an apparatus for rapidly and efficiently handling and orienting cathode ray tube cathodes.

These objects are accomplished in one aspect of the invention by the provision of a fragile article handling and orientating apparatus which comprises a disoriented, random supply of the articles to be handled. Pick-up means are associated with the supply and adjacent thereto. Means for actuating the pick-up means into engagement with the supply are provided whereat the pick-up means engages a plurality of the articles. Actuating means are then provided for moving the pick-up means to a delivery zone. Intermediate the supply and the delivery zone, stripper means are provided for removing all but one article and insuring that the remaining article has a particular desired orientation. Further means are then provided at the delivery zone for removing the article.

BRIEF DESCRIPTION OF THE DRAWINGS

FIG. 2a is an elevational view with some parts in section and other parts broken away in the interest of clarity illustrating generally a portion of the apparatus of the invention;

FIG. 2b is an elevational view illustrating the remaining portion of the apparatus of FIG. 2a;

DESCRIPTION OF THE PREFERRED EMBODIMENTS

For a better understanding of the present invention, together with other and further objects, advantages, and capabilities thereof, reference is made to the following disclosure and appended claims in conjunction with the above described drawing.

Figure 1:
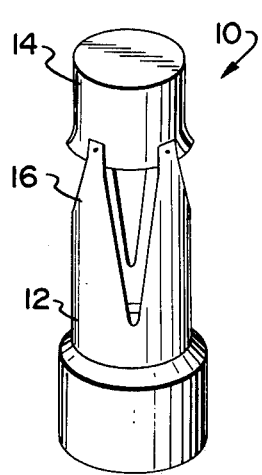
FIG. 1 is an elevational view illustrating one type of fragile article that can be employed with the invention.

Referring now to the drawings with greater particularity there is shown in FIG. 1 an article 10 such as can be employed with this invention. In this instance, article 10 is a fast warm-up cathode for a cathode ray tube. The cathode comprises a tubular hollow stack 12, and a substantially cup-shaped top cap 14. Limited area contact means 16, which are in the form of tabs, connect the stack and the top cap. In this form of construction the stack is formed from a passive, non-magnetic nickel material whereas the top cap 14 is formed from an active, magnetic nickel material.

The apparatus for handling and orientating article 10 is shown in FIG. 2. Herein, the apparatus 18 comprises a random disoriented supply 20 of articles 10. A suitable supply can be in the form of a vibrating hopper 22 driven by any suitable means 24, which can be mounted upon a support 26. A main upright support 28 is positioned adjacent the article supply and mounts at its upper end above the supply, a fluid motor 30. The fluid motor 30 has a depending shaft 32, at least the lower terminal portion 34 thereof being formed to provide magnetic pick-up means. In the embodiment shown, pick-up means 34 is a cylindrical solid permanent magnet which is suitably affixed to shaft 32 of fluid motor 30.

A delivery zone 36 is mounted on main support 28 and comprises a rectangular box-like structure having a vertically aligned aperture 38 through which pick-up means 34 can pass. At least a portion of the article supply 20 is positioned directly beneath the path of pick-up means 34. Intermediate the lower portion of the delivery zone 36 and the hopper 22 is a stripper means 40 which comprises a rectangular plate having an aperture 42 of a size sufficient to allow the passage of one particularly aligned article 10. Also encompassed within the delivery zone 36 are article removal means 44 and article carrying means 46.

In the embodiment shown the article removal means comprises a blast of dry filtered air delivered to the delivery zone 36 by means of a suitable hose 48, which leads to a suitable air supply. The direction of the air blast is substantially at right angles to the direction of travel of pick-up means 34. The article carrying means 46 is diametrically opposed to the article removal means and comprises, in this particular embodiment, a hollow tube 50 which is provided with a plurality of pressure relief means 52 in the form of apertures therethrough. The interior of the tube 50 communicates with a suitable aperture through support 28 and communicates with the removal chamber 54 provided within delivery zone 36.

Figure 3:
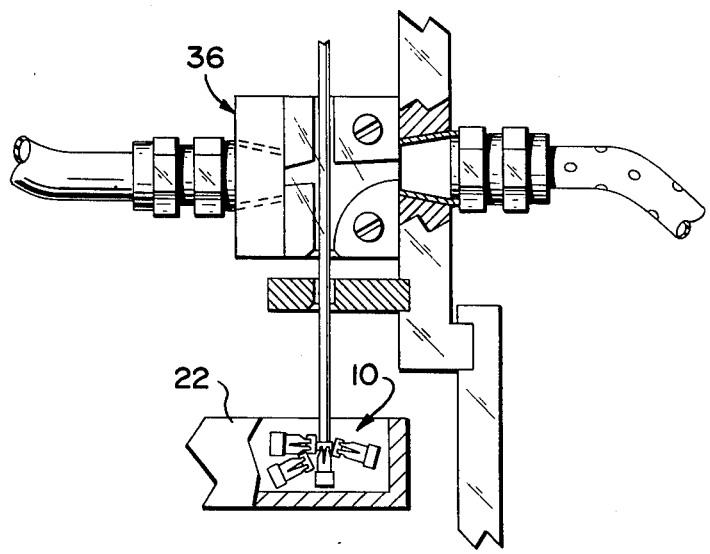
FIGS. 3, 4, and 5 are similar views of the delivery zone and pick-up means of the invention and illustrate a sequence of operation of the apparatus.
Figure 4:
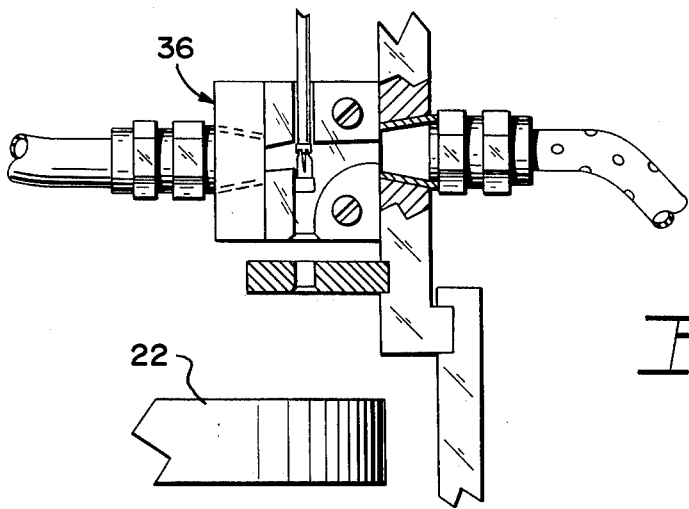
Figure 5:
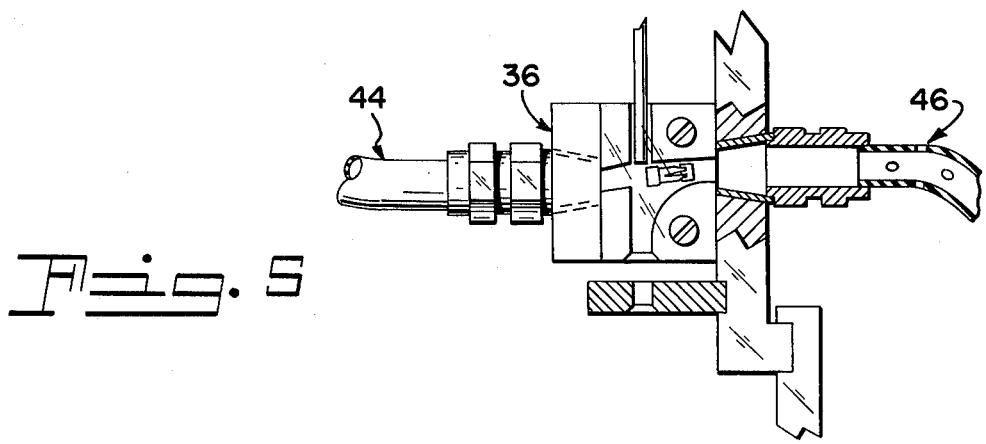
Figure 6:
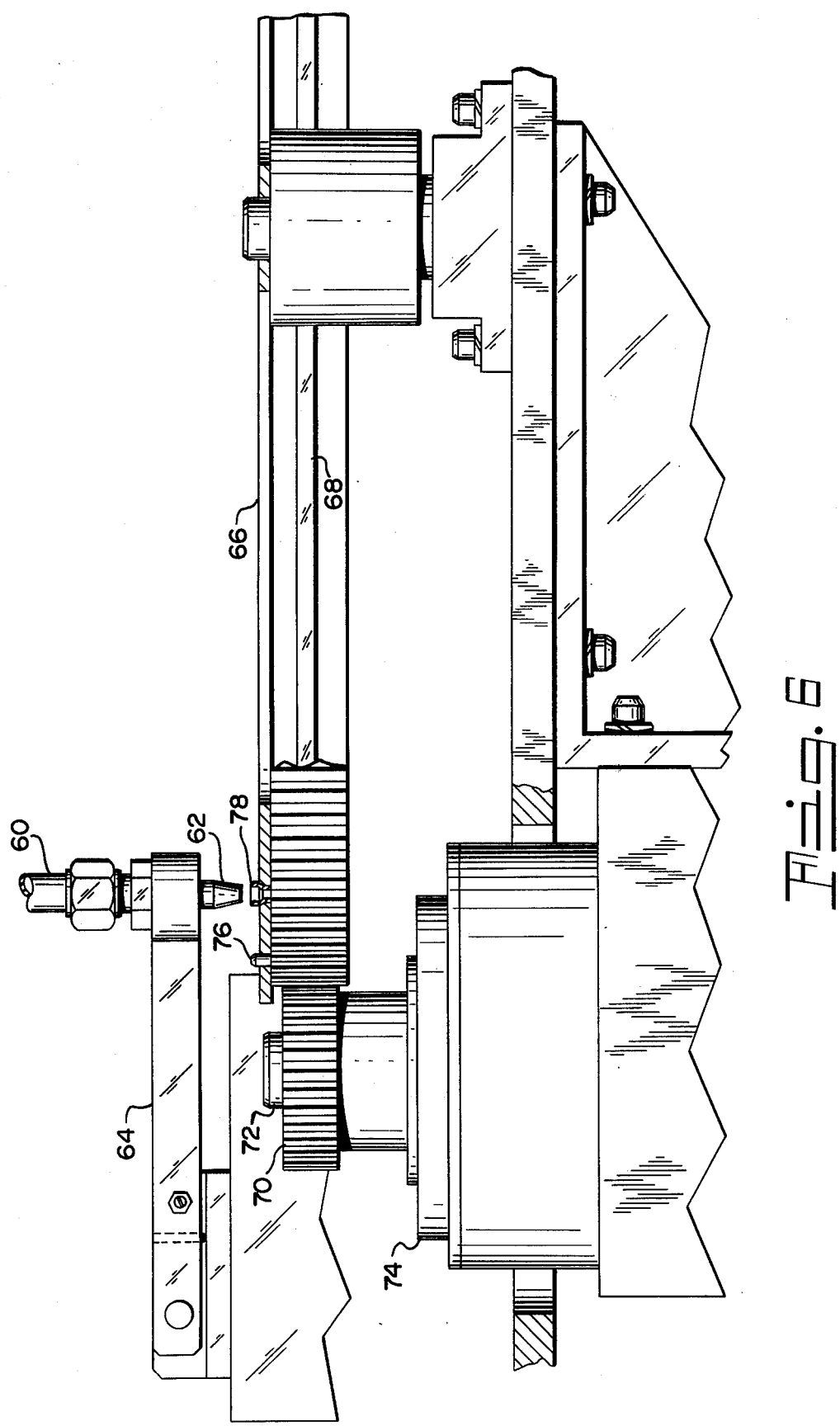
FIG. 6 is a view of one type of apparatus into which the articles may be delivered.

A sequence of operation can be followed by referring to FIGS. 2, 3, 4, and 5. In referring to FIG. 2, it will be seen that fluid motor 30 is provided with upper and lower fluid pressure inlet means 56 and 58 respectively. Fluid pressure inlet means 56 is at the upper portion of fluid motor 30 and fluid pressure inlet means 58 is at the lower portion of fluid motor 30 in this embodiment. At the beginning of the operative cycle fluid pressure is applied through fluid pressure inlet 56 to drive the piston of fluid motor 30 downwardly. Since the pick-up means 34 is positioned at the terminal portion of the shaft 32 of fluid motor 30, the pick-up means 34 also progresses downwardly through aperture 38 in delivery zone 36 and passes through aperture 42 in stripper means 40 and into contact with the disoriented supply of articles 10 in the hopper 22. This is shown in partial section in FIG. 3. When the magnetic pick-up means 34 encounters the articles 10 it will pick-up a plurality of the articles as shown in FIG. 3. Since the top cap of the article 10 is magnetic a suitable random supply of the articles is present, at least one of the articles should assume a proper orientation. The orientation that is desired includes an article properly aligned with the vertical axis of the pick-up means 34 and magnetically fastened thereto by the uppermost surface of the top cap. It is also extremely likely that numerous other top caps of articles 10 may attach themselves in a random distribution to the pick-up means 34. After the downward movement of pick-up means 34 into the hopper the cycle is reversed by applying fluid pressure through fluid pressure inlet means 58 to drive the piston of fluid motor 30 back in an upward direction. As the pick-up means 34 attached thereto thus rises upwardly, it passes through aperture 42 in stripper means 40 and all but one article 10 is stripped therefrom. If an article 10 is not properly aligned when it reaches the stripper, the stripper 40 will align it in a desired orientation, as it is pulled through aperture 42 and into the delivery zone 36 as is shown in FIG. 4. With the properly oriented article maintained in the delivery zone, a blast of air from a suitable air supply through hose 48 of article removal means 44 is delivered to the delivery zone 36. The blast of air is of sufficient force to drive the article 10 from the pick-up means 34 and through chamber 54 into the article carrying means 46. The radius 59 provided at the lower corner of the delivery zone aids in turning the article and delivering it in a desired orientation into the article carrying means 46 as is shown in FIG. 5.

While the initial journey of article 10 into the article carrying means 46 is accomplished by means of the blast of air, it is preferable that the remainder of the journey be accomplished primarily by gravity feed. To serve this purpose, the proximal portion of article carrying means 46 is provided with the beforementioned pressure release means 52 in the form of apertures penetrating hose 50. This allows the pressured blast of air from the article removal means to be dissipated almost immediately as the article 10 is presented to the carrying means and allows the remainder of the journey to be primarily by gravity feed.

One suitable application for this apparatus can be employed in traying the articles 10 so that a subsequent function or operation can be performed thereon. In this regard the distal portion (FIG. 2b) 60 of the article delivery means can be fed or connected to an article dispensing tip 62. The article dispensing tip can be mounted on a suitable pivotable arm 64, which can be conveniently mounted by any desired means. The dispensing tip can be aligned with a position over a suitable area on a disc-like traying device 66, which can be mounted upon a rotatable peripheral gear 68. The peripheral gear can be driven by a suitable drive gear 70 mounted upon the shaft 72 of a motor 74. The disc-like tray can be held in position on the driven gear 68 by means of a plurality of pins 76 which are inserted into gear 68 and pass through traying disc 66. The disc can be provided with upwards of several hundred article receiving cups 78, only one of which is shown. Thus, by means of any suitable timing apparatus, the traying disc 66 positions a cup 78 under the dispensing tip 62. Upon actuation of apparatus 18, an article 10 is suitably oriented and picked-up by pick-up means 34 and delivered to the delivery zone 36. At that position, the article removal means is actuated and article 10 is delivered into the carrying means 46 and thence into dispensing tip 62 whereat it is departed in the article receiving cup 78. Thereafter, the disc-like traying apparatus will be indexed one position and the entire cycle repeated until the traying disc 66 is completely filled. At this point arm 64 is pivoted upwardly to a remote position and disc 66 is removed and transferred to another location whereat suitable, desired operations may be performed upon the trayed articles.

While this traying apparatus has been described with merely a single delivery zone it will be apparent that the loading time for something like the traying disc can be halved or even quartered by simply positioning more than one apparatus 18 in suitable locations about the periphery of the disc 66. Thus, any desired number of articles can be loaded at one time. Also, the tray can be rectangular and moved by linear motion.

While there have been shown what are at present considered to be the preferred embodiments of the invention it will be obvious to those skilled in the art that various changes and modifications can be made therein without departing from the scope of the invention as defined by the appended claims.

What is claimed is:

1. An apparatus for handling and orienting fragile, fast warm-up cathodes for cathode ray tubes, said cathodes comprising a two piece unit only one piece of which is magnetic, comprising, in combination: a disoriented supply of said cathodes; vertically arrayed, reciprocating pick-up means associated with said supply and positioned thereover, the terminal portion of said pick-up means which engages said supply being magnetic; means for activating said pick-up means from a delivery zone into engagement with said supply through an apertured stripper means positioned therebetween whereby said pick-up means engages a plurality of said cathodes; means for moving said pick-up means back to said delivery zone whereby said stripping means is again engaged and all but one of said cathodes is stripped off, said remaining cathode having a particular, desired orientation; and means for removing said cathode from said delivery zone.

2. The apparatus of claim 1 wherein means are included for carrying said removed article from said delivery zone to a remote location.

3. The apparatus of claim 1 wherein said disoriented supply of said articles is contained in a vibratory hopper.

4. The apparatus of claim 2 wherein said means for carrying said removed article comprises a hose into which said article is delivered.

5. The apparatus of claim 4 wherein said means for removing said article from said delivery zone comprises a blast of a pressurized gas.

6. The apparatus of claim 5 wherein said hose includes pressure relief means.

7. The apparatus of claim 2 wherein said delivery zone comprises: a block having a first vertical passage therethrough to accommodate movement of said pick-up means and said article in said desired orientation; and a second passage therethrough substantially orthagonal to and intersecting said first passage to form first and second sections.

8. The apparatus of claim 2 wherein said first section of said second passage is connected to the source of said pressurized gas.

9. The apparatus of claim 8 wherein said second section of said second passage is connected with said means for carrying said article to said remote location.

* * * * *